United States Patent
Kim et al.

(10) Patent No.: US 9,934,687 B2
(45) Date of Patent: Apr. 3, 2018

(54) METHOD FOR PROVIDING SOUND DETECTION INFORMATION, APPARATUS DETECTING SOUND AROUND A VEHICLE, AND A VEHICLE INCLUDING THE SAME

(71) Applicant: HYUNDAI MOTOR COMPANY, Seoul (KR)

(72) Inventors: Jae Kwang Kim, Seoul (KR); Yoon Ho Jang, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/293,022

(22) Filed: Oct. 13, 2016

(65) Prior Publication Data
US 2017/0263126 A1    Sep. 14, 2017

(30) Foreign Application Priority Data
Mar. 10, 2016    (KR) .................. 10-2016-0028654

(51) Int. Cl.
| | |
|---|---|
| H04R 29/00 | (2006.01) |
| G08G 1/16 | (2006.01) |
| G01S 5/18 | (2006.01) |
| G06N 7/00 | (2006.01) |
| G10L 25/51 | (2013.01) |
| G01S 5/22 | (2006.01) |

(52) U.S. Cl.
CPC ............... *G08G 1/163* (2013.01); *G01S 5/18* (2013.01); *G01S 5/22* (2013.01); *G06N 7/005* (2013.01); *G10L 25/51* (2013.01)

(58) Field of Classification Search
CPC combination set(s) only.
See application file for complete search history.

(56) References Cited

U.S. PATENT DOCUMENTS

| | | | |
|---|---|---|---|
| 8,184,827 B2 | 5/2012 | Yoshizawa et al. | |
| 2007/0229238 A1* | 10/2007 | Boyles | G06K 9/00369 340/435 |
| 2009/0322559 A1 | 12/2009 | Yen et al. | |
| 2010/0228462 A1 | 9/2010 | Yonak | |
| 2012/0296567 A1* | 11/2012 | Breed | G01C 21/26 701/468 |

(Continued)

FOREIGN PATENT DOCUMENTS

| | | |
|---|---|---|
| JP | 1993-092767 U | 12/1993 |
| JP | 2000-105274 A | 4/2000 |

(Continued)

*Primary Examiner* — Duc Nguyen
*Assistant Examiner* — Assad Mohammed
(74) *Attorney, Agent, or Firm* — Brinks Gilson & Lione (57) ABSTRACT

A method for providing sound tracking information includes detecting a sound occurred adjacent to a subject vehicle and generating a sound tracking result based at least on sound data regarding detected sound, determining a detect on category as one of a non-vehicle detection, an error detection or a vehicle detection, based at least on the sound tracking result, and determining an error detection index adjusted based at least on the detection category as well as whether a notification based at least on the detection category is generated. Herein, the sound tracking result includes a probability of whether there is at least one other vehicle at each of a plurality of angles in each of a plurality of frames continued according to time.

17 Claims, 9 Drawing Sheets

(56) References Cited

U.S. PATENT DOCUMENTS

| | | | |
|---|---|---|---|
| 2013/0010980 A1 | 1/2013 | Yoshioka et al. | |
| 2013/0188794 A1* | 7/2013 | Kawamata | G01S 3/803 |
| | | | 381/56 |
| 2014/0369509 A1* | 12/2014 | Fukamachi | G01S 13/93 |
| | | | 381/56 |
| 2015/0158482 A1* | 6/2015 | Kaminade | G01S 3/86 |
| | | | 701/1 |
| 2015/0371516 A1* | 12/2015 | Petersen | G08B 21/02 |
| | | | 340/539.12 |

FOREIGN PATENT DOCUMENTS

| | | |
|---|---|---|
| JP | 2008-149917 | 7/2008 |
| JP | 2011-242343 | 12/2011 |
| JP | 2011-252853 | 12/2011 |
| JP | 2012-145461 | 8/2012 |
| JP | 2013-238911 A | 11/2013 |
| JP | 2014-067092 A | 4/2014 |
| KR | 10-2013-0079877 A | 7/2013 |

* cited by examiner

METHOD FOR PROVIDING SOUND DETECTION INFORMATION, APPARATUS DETECTING SOUND AROUND A VEHICLE, AND A VEHICLE INCLUDING THE SAME

CROSS REFERENCE TO RELATED APPLICATIONS

The present application claims priority to and the benefit of Korean Patent Application No. 10-2016-0028654 filed on Mar. 10, 2016 in the Korean Intellectual Property Office, the entire disclosure of which is hereby incorporated by reference as if fully set forth herein.

BACKGROUND OF THE INVENTION

1. Technical Field

The disclosure relates generally to a method for providing sound detection information and an apparatus for detecting a sound being around a subject vehicle, and more particularly, to a method and an apparatus for providing tracking information about sounds so as to recognize vehicles running adjacent to a subject vehicle, and a vehicle capable of recognizing a traffic based on the tracking information about the sounds via a driver assistance device.

2. Description of the Related Art

There are various types of sounds adjacent to a vehicle driving on a road. If a driver is an aged person having at least partially impaired hearing or a person who has a bad sense of sound direction, he or she would be slow to produce a response to a particular sound made by a warning horn, a siren or the like, which he or she should pay attention to. In addition, since an in-vehicle technology regarding sound insulation has been developed, it is likely that a driver having great hearing could not correctly hear a noise/sound that occurred outside of a vehicle. It might be unsafe for a drier to not keep their eyes facing forward when he or she listens to a specific sound originating from the rear of the vehicle.

Accordingly, it might be desirable that information about a particular sound, such as what kind of sounds exists adjacent to a vehicle, which direction a sound comes from and the like, is informed to a driver without disruptions to driving safety. However, if a driver receives information about some sounds generated by his or her vehicle, such as sibilant voices from tires, which he or she is not required to care about, a driving safety could be at risk so that a notification about the information should be not generated or delivered.

SUMMARY OF THE INVENTION

An apparatus, a method and a vehicle are described for providing to a driver specific information regarding vehicles traveling adjacent to the vehicle based at least on tracking information about sounds.

A method for providing sound tracking information can include detecting a sound occurred adjacent to a subject vehicle and generating a sound tracking result based at least on sound data regarding the detected sound; determining a detection, category as one of a non-vehicle detection, an error detection or a vehicle detection, based at least on the sound tracking result; and determining an error detection index adjusted based at least on the detection category as well as whether a notification based at least on the detection category is generated. Herein, the sound tracking result includes a probability of whether there is at least one other vehicle at each of a plurality of angles in each of a plurality of frames continued according to time.

The determining a detection category can include determining whether there is at least one angle where the probability is higher than a predetermined threshold in the sound tracking result to detect the at least one another vehicle; and determining whether there is the error detection when the at least one another vehicle is detected.

The determining whether there is the error detection can include determining whether the error detection exists based at least on a similarity between a current frame and an average pattern data about patterns existing when an error based on sibilant noises from rear tires of the subject vehicle are detected.

The determining whether there is the error detection can include determining whether the error detection exists based at least on symmetry of a current frame in the sound tracking result.

The error detection index can be increased by 1 when the detection category is the error detection, and dropped by 5 when the detection category is one of the non-vehicle detection and the vehicle detection.

The determining an error detection index can include maintaining a previous notice status when the error detection index is below a predetermined threshold and the detection category is the error detection.

The determining an error detection index can include generating a notification signal when the error detection index is below a predetermined threshold and the detection category is the vehicle detection.

The determining an error detection index can include avoiding generating a notification signal when the error detection index is over a predetermined threshold.

An apparatus for providing sound tracking information can include a sound tracking unit configured to detect a sound occurred adjacent to a subject vehicle and to generate a sound tracking result based at least on sound data regarding the detected sound; a vehicle detection unit configured to determine a detection category as one of a non-vehicle detection, an error detection or a vehicle detection, based at least on the sound tracking result; and an error avoiding unit configured to determine an error detection index adjusted based at least on the detection category as well as whether a notification based at least on the detection category is generated. Herein, the sound tracking result includes a probability of whether there is at least one other vehicle at each of a plurality of angles in each of a plurality of frames continued according to time.

The vehicle detection unit can be configured to determine whether there is at least one angle where the probability is higher than a predetermined threshold in the sound tracking result to detect the at least one other vehicle, and to determine whether there is the error detection when the at least one other vehicle is detected.

The vehicle detection unit can be configured to determine whether the error detection exists based at least on a similarity between a current frame and an average pattern data about patterns existing when an error based on sibilant noise from rear tires of the subject vehicle are detected.

The vehicle detection unit can be configured to determine whether the error detection exists based at least on symmetry of a current frame in the sound tracking result.

The error detection index can be increased by 1 when the detection category is the error detection, and dropped by 5 when the detection category is one of the non-vehicle detection or the vehicle detection.

The error avoiding unit can be configured to maintain a previous notice status when the error detection index is below a predetermined threshold and the detection category is the error detection.

The error avoiding unit can be configured to generate a notification signal when the error detection index is below a predetermined threshold and the detection category is the vehicle detection.

The error avoiding unit can be configured to avoid generating a notification signal when the error detection index is over a predetermined threshold.

A vehicle can include a multi-channel microphone configured to detect a sound occurred adjacent to a subject vehicle and to generate sound data regarding the sound; a sound tracking device configured to determine a detection category as one of a non-vehicle detection, an error detection or a vehicle detection, based at least on a sound tracking result based at least on the sound data, and to determine an error detection index adjusted based at least on the detection category as well as whether a notification based at least on the detection category is generated; and a notification interface configured to acoustically or visually inform a driver of information about at least one vehicle adjacent to the subject vehicle when the notification is generated.

An apparatus for providing sound tracking information in a vehicle may include a processing system that comprises at least one data processor and at least one computer-readable memory storing a computer program. Herein the processing system is configured to cause the apparatus to: detect a sound occurred adjacent to a subject vehicle and to generate a sound tracking result based at least on sound data regarding the detected sound; determine a detection category as one of a non-vehicle detection, an error detection or a vehicle detection, based at least on the sound tracking result; and determine an error detection index adjusted based at least on the detection category as well as whether a notification based at least on the detection category is generated. Herein, the sound tracking result includes a probability of whether there is at least one other vehicle at each of a plurality of angles in, each of a plurality of frames continued according to time.

A non-transitory computer readable medium can store a program causing a processing system to execute a process for providing sound tracking information. The process includes detecting a sound occurred adjacent to a subject vehicle and to generate a sound tracking result based at least on sound data regarding the detected sound; determining a detection category as one of a non-vehicle detection, an error detection or a vehicle detection, based at least on the sound tracking result; and determining an error detection index adjusted based at feast on the detection category as well as whether a notification based at least on the detection category is generated. Herein, the sound tracking result includes a probability of whether there is at least one other vehicle at each of a plurality of angles in each of a plurality of frames continued according to time.

BRIEF DESCRIPTION OF THE DRAWINGS

The accompanying drawings, which are included to provide a further understanding of the disclosure and are incorporated in and constitute a part of this application, illustrate form(s) of the disclosure and together with the description serve to explain the principle of the disclosure. In the drawings.

DETAILED DESCRIPTION OF THE PREFERRED EMBODIMENTS

Reference will now be made in detail to exemplary forms of the disclosure, examples of which are illustrated in the accompanying drawings. In the drawings, the same elements are denoted by the same reference numerals, and a repeated explanation thereof will not be given. The suffixes "module" and "unit" of elements herein are used for convenience of description and thus can be used interchangeably and do not have any distinguishable meanings or functions.

The terms "a" or "an", as used herein, are defined as one or more than one. The term "another", as used herein, is defined as at least a second or more. The terms "including" and/or "having" as used herein, are defined as comprising (i.e. open transition). The term "coupled" or "operatively coupled" as used herein, is defined as connected, although not necessarily directly, and not necessarily mechanically.

In the description of the disclosure, certain detailed explanations of related art are omitted when it is deemed that they may unnecessarily obscure the essence of the invention. The features of the disclosure will be more clearly understood from the accompanying drawings and should not be limited by the accompanying drawings. It is to be appreciated that all changes, equivalents, and substitutes that do not depart from the spirit and technical scope of the invention are encompassed in the invention.

Figure 1:
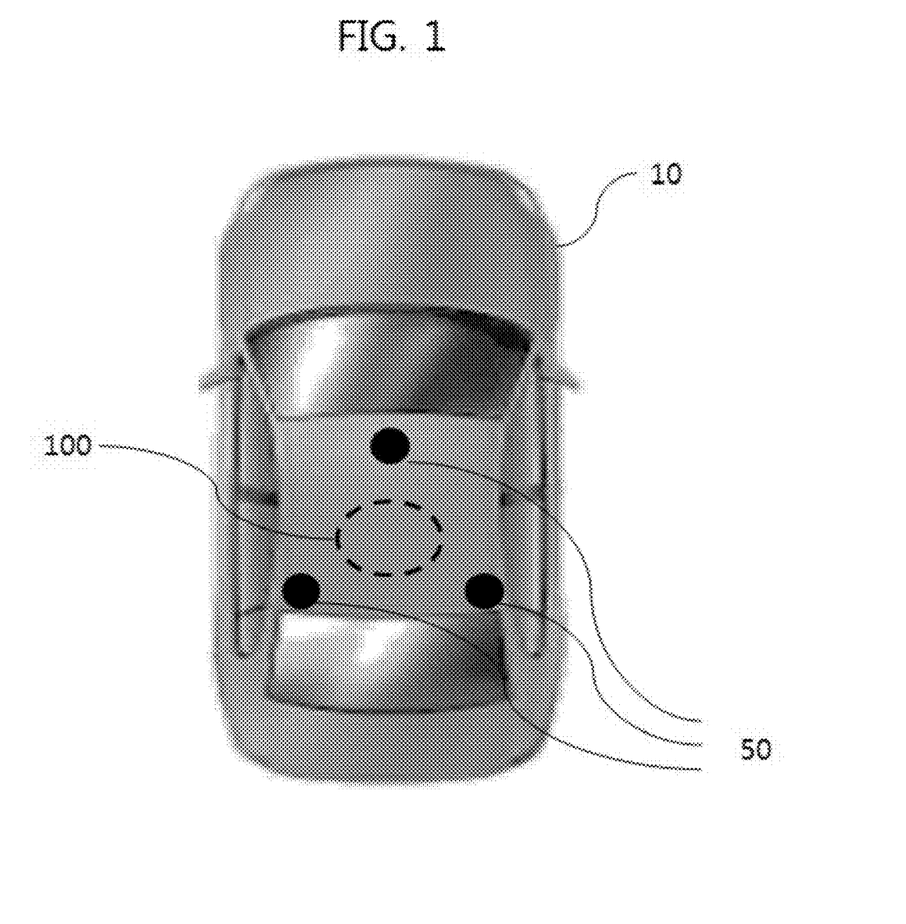
FIG. 1 shows a vehicle.

FIG. 1 shows a vehicle. As shown, a vehicle 10 can provide a notification to a driver after generating information about a specific sound, such as what kind of sounds occurs adjacent to the vehicle 10 while driven by the driver, which direction it comes from, and the like.

The vehicle 10 can include a multi-channel microphone 50 configured to collect a sound outside the vehicle 10 and a sound tracking apparatus 100 configured to generate information about a specific sound based at least on sound data collected by the multi-channel microphone 50. Each microphone of the multi-channel microphone 50 can be considered a single channel. By the way of example but not limitation, there are 3 microphones of the multi-channel microphone 50. Though plural locations of microphones in the vehicle 10 are shown in FIG. 1, the locations can be changed.

Figure 2:
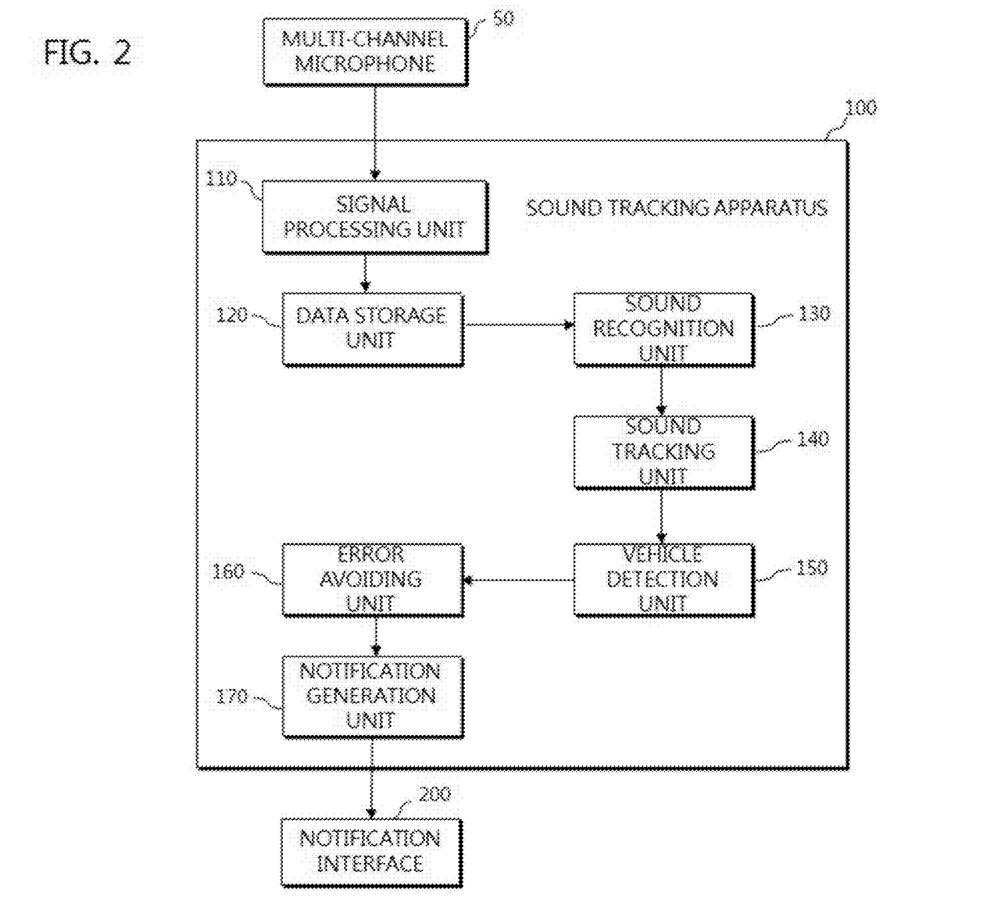
FIG. 2 shows a sound tracking apparatus shown in FIG. 1.

Referring to FIG. 2, detailed operations of the sound tracking apparatus 100 are described.

FIG. 2 shows the sound tracking apparatus 100 shown in FIG. 1.

As shown, the sound tracking apparatus 100 can include a signal processing unit 110, a data storage unit 120, a sound recognition unit 130, a sound tracking unit 140, a vehicle detection unit 150, an error avoiding unit 160, and a notification generation unit 170. By the way of example but not limitation, the sound tracking apparatus 100 can be designed to be equipped within ahead unit of the vehicle 10.

The multi-channel microphone 50 can detect that a sound occurred adjacent to the vehicle 10 to generate sound data regarding the sound through an analog-digital conversion, and deliver the sound data into the signal processing unit 100.

There are various types of sounds lying near or close to, a vehicle. For example, there are engine sounds coming from other vehicles near the vehicle, sibilant voices from rear tires, sounds made by traffic signs, electric signs or the like, sounds of nature, and so on.

A driver, while driving the vehicle 10, would like to know a status and a relational location of another vehicle which could travel in a blind area in front of, behind, or to a side of the vehicle 10. Herein, the status can include whether another vehicle is attempting to pass the vehicle 10.

Some of the sounds existing outside the vehicle 10 could not be delivered into a driver because of an in-vehicle sound insulation system. Accordingly, when a warning horn sound is heard, the driver would like to know which direction the warning horn sound comes from or whether the warning horn sound is relevant to the vehicle 10. If properly recognizing the warning horn sound, the driver can slow down the vehicle, change a lane of road, turn on an emergency lamp, or the like.

Further, when turning up the volume of an in-vehicle audio system, the driver could not catch or hear a warning horn sound near the vehicle. In this case, it might be necessary to acoustically or visually inform the driver in the event that a warning horn sound occurs nearby the vehicle is an in-vehicle audio system.

A driver can be interested in another sound. For example, when a vehicle is stopped suddenly, a loud frictional sound can be generated because of a friction between the ground and tires. The loud frictional sound can be relevant to a car accident or a near car accident so that it could be desirable to caution the driver. For another example, a bang occurs when a vehicle collides with another vehicle. If a bang occurred on the front, the side or the like of a vehicle, the sound could be recognized as v as direction information about where the bang occurs is provided to the driver to a low the driver to avoid another subsequent car accident/ clash.

When there is a loud prolonged signal or a lining sound made by a siren equipped on an ambulance or a police car that is nearby or close to a vehicle, a driver should move the vehicle so that the ambulance or the police car can pass the vehicle. In a particular situation, if the driver would not do required actions, he or she can face legal punishment. Accordingly, it be useful for the a vehicle to assist a driver to recognize a loud prolonged signal or a warning sound coming from an emergency vehicle or a government-operated vehicle.

The signal processing unit 110 can perform a noise filtering against delivered sound data. Various noises, which are difficult to understand a characteristic or a source of sounds, can be removed by the noise filtering. Most of driver's interested sounds such as a warning horn sound, siren sound, a loud frictional sound, a bang and the like can have a sufficiently high decibel (dB) level, e.g., over 70 dB. Thus, the signal processing unit 110 can determine whether a sound data after a noise removed has a higher decibel level than, or equal to, a reference level. That is, the sound data having a lower a decibel level than the reference level can be deleted by the signal processing unit 110.

The data storage unit 120 can store the sound, data of which a noise is removed. The data storage unit 120 can store the sound data as a unit of a frame, and provide the sound data into the sound recognition unit 130. By way of example but not limitation, the frame can include a plurality of sound data collected at a particular time, and an interval between each of frames can be a specific constant time (e.g., 410 ms, 100 ms, etc.).

The sound recognition unit 130 can analyze characteristics of sound data. Even if having a higher decibel level than the reference level, the sound data might not be important to a driver. For example, though sounds coming from a tram, sounds coming from flights near an airport or the like can have a higher decibel level, those sounds might not affect the driver taking the wheel. Noises occurring in a road recovery, a republishing project and etc., are the same. If these sounds are informed a driver continuously, it is likely that driver's response becomes slow or does not exist in a case when the driver should pay attention.

Regarding the sound data delivered from the data storage unit 120, the sound recognition unit 130 can extract particular values in both a time domain and a frequency domain. The sound recognition unit 120 can build a database including an average value and a variation value of the particular values. Herein, the particular values can include Mel-Frequency Cepstral Coefficients (MFCCs), a Total Spectrum Power (TSP), a Sub-band Spectrum Power (SSP), and/or a pitch frequency. The sound recognition unit 120 can store an average, value and a variation value of a predetermined tune period (e.g., a frame of 100 ms) about the sound data in the database.

In a technical field of sound signal processing, Mel-Frequency Cepstrum (MFC) is one of the methods representing a short-term power spectrum of a sound. The MFC can be obtained based on a linear cosine transform of a log power spectrum on a nonlinear Mel scale of frequency. Mel-frequency cepstral coefficients (MFCCs) are coefficients that collectively make up an MFC. Generally, MFCCs uses a pre-emphasis filter for a short-term sound data (signal), and then applies Discrete Fourier Transform (DFT). In MFCCs, a power spectrum can be obtained by Mel Filter Banks, and logarithm is used to the power spectrum. Then, MFCCs can be obtained by applying Discrete Cosine Transform (DCT) to the logarithm value.

The power spectrum can show an energy distribution in a predetermined frame, and the sub-band spectrum power can describes energy distribution values in generally four sub-band spectrums such as $[0, \frac{1}{8}f0]$, $[\frac{1}{8}f0, \frac{1}{4}f0]$, $[\frac{1}{4}f0, \frac{1}{2}f0]$ and $[\frac{1}{2}f0, f0]$. The pitch frequency can be obtained based at least on an autocorrelation function. Herein, pitch can be the fundamental frequency of an audio waveform and is a parameter in the analysis of sounds such as speech and music signals, and the pitch frequency can be estimated by the reciprocal of the time period between the original and the first valley on an average magnitude different function (AMDF) curve. After estimating the pitch frequency for sound data, pitch contour (PC), pitch standard deviation (PSTD), smooth pitch ratio (SPR) and non-pitch ratio (NPR) can be some effective features for classifying the sound data into different categories.

The sound recognition unit 130 can use a classifier configured to classify characteristic values about the sound data obtained by above described methods to recognize whether the sound data includes a specific sound which a driver would be interested in. The classifier can include one of a neural network classifier, a Support Vector Machine (SVM), and a Bayesian classifier.

Hereinafter, an example where the sound recognition unit 130 uses the neural network classifier is described.

The classifier of the sound recognition unit 130 can classify sounds as plural classes based on a type of sounds, and use the characteristic values regarding the obtained sound data to estimate or calculate a confidence level of the sound data based at least on a similarity between the sound data and the plural classes. That is, the confidence level includes a probability that the sound data can be categorized as a specific class. The total summation of the confidence level can be one.

A sound classification result generated by the classifier of the sound recognition unit 130 can include information about each class, a type of sound corresponding to each class, and a confidence level corresponding to each class.

The sound recognition unit 130 can determine whether the confidence level of the sound data is equal to, or greater than, a threshold (e.g., 0.7), and add a determination result into the sound classification result. That is, in a case when the confidence level is equal to, or larger than, the threshold, the sound recognition unit 130 can determine a specific class corresponding to the confidence level as a type of sound data.

Accordingly, the sound recognition unit 130 can analyze characteristics of sound data to generate a sound classification result considered information about which type of sounds the sound data is.

Regarding, a type of sound (or a target sound) basing a confidence level being higher than the threshold of a specific class, which is categorized as a specific class, the sound tracking unit 140 can track a sound direction, i.e., where a sound comes front, based at least on the sound data. The type of sound can be provided by the sound recognition unit 130.

The sound tracking unit 140 can accumulate sound data included in consecutive frames, recognize a similarity of sound entered via each microphone in waveform (with sound's time characteristic), and measure a difference between timings of receiving the sound data is each of microphones. The sound's time characteristic can be provided by the sound recognition unit 130.

The volume of the sound is in inverse proportion to the squared distances. When a distance is double far from a location where a sound occurs, the volume of the sound can decrease by ¼ (approximately 6 dB). In a case that it is assumed that a typical vehicle has a width of about 2 m and a length of about 3 m, a difference, between volumes of detected sounds (sound data) can be useful information based on the location where the sound occurs.

By way of example but not limitation, when the multi-channel microphone 50 is equipped in a vehicle shown in FIG. 1, if a sound occurs at an upper right of the vehicle, a volume of sound detected by a microphone arranged at an upper of the vehicle is larger than those detected by microphones arranged at lower right and left of the vehicle. In addition, a volume of sound detected by the microphone arranged at lower right of the vehicle is larger than that detected by the microphone arranged at lower left of the vehicle.

Based at least on those characteristics, volumes of sounds collected from each of microphones can be used for tracking a general direction on a subject vehicle basis.

Further, a difference between timings of receiving a sound via each of microphones (e.g., signal delay) can be used for measuring an angle about a position where the sound occurs. The sound hacking unit 140 stores table/matrix type data containing mapping information between the angle about a position where the sound occurs and a signal delay corresponding to each of microphones. By way of example but not limitation, in the table/matrix type data, one degree is associated with a predetermined first time t1 (a signal delay for a first microphone), a predetermined second time t2 (a signal delay for a second microphone), and a predetermined third time t3 (a signal delay for a third microphone). Further, a probability that a tracking target is placed at the one degree can be estimated by the summation of values obtained by applying signal delays t1, t2, t3 to sound data stored in the data storage unit 120, which is collected via each of microphones.

That is, delay values for each of all angles can be applied to a current signal (sound data) so as to measure a probability that a tracking target is placed at each degree. Accordingly, a location/position where a sound occurs can be estimated. It is because each combination of an angle about the location/position where the sound occurs and a signal delay corresponding to each of microphones can be one to one correspondence with each other.

Using that information, the sound tracking unit 140 can generate the sound tacking information for each angle relative to the vehicle 10 in consecutive frames.

The sound tracking information can include a probability of whether there is an object (e.g., another vehicle) at each angle, which is matched with a target sound in each frame continued according to a time.

Hereinafter, at can be assumed that an apparatus can collect only a fricative sound around a subject vehicle (e.g., sibilant voices coming from tires). In this case, a sound tracking information based at least on detected/collected fricative sounds in each frame continued as to a time can include a probability of whether there is another vehicle near to, and each angle relative to, the subject vehicle 10.

The vehicle detection unit 150 can determine whether there is another vehicle based at least on the sound tracking information. Further, when determining that another vehicle exists close to the subject vehicle, the vehicle detection unit 150 can determine whether there is an error detection caused by sibilant voices from rear tires of the subjects vehicle, not from another vehicle.

When there is another vehicle near the subject vehicle and there is no error condition, the vehicle detection unit 150 can determine that a current detection category is vehicle detection.

If there is another vehicle near the subject vehicle and there is an error condition, the vehicle detection unit 150 can determine that a current detection category is error detection.

When there is no other vehicle near the subject vehicle, the vehicle detection unit 150 can determine that a current detection category is non-vehicle detection.

The vehicle detection unit 150 can deliver the detection category and corresponding angle information (i.e., angle of another vehicle's position relative to the subject vehicle when another vehicle is detected) into the error avoiding unit 160.

The error avoiding unit 160 can determine whether a notification is generated for a driver based at least on the detection category and an error detection index adjustable according to the detection category. The error detection index is a kind of factor used for final decision of whether the detection category includes an error. The error detection index can be an integer larger than or equal to 0.

The error avoiding unit 160 can determine whether generating the notification for the driver as well as control the notification generation unit 170 to generate, or block to generate, the notification, or keep a previous notice status. When determining that the notification would be generated, the error avoiding unit 160 can deliver the corresponding angle information into the notification generation unit 170.

Detailed operations of the vehicle detection unit 150 and the error avoiding unit 160 are described later, referring to FIGS. 4 to 10.

The notification generation unit 170 controlled by the error avoiding unit 160 can generate the notification including information (location, speed, angle, etc.) about another vehicle close to the subject vehicle.

The notification interface 200 can deliver, into a driver, information about a location where a sound occur based at least on the notification provided by the sound tracking apparatus 100. By way of example but not limitation, the notification interface 200 can acoustically, visually or both provide the information to the driver.

The notification interface 200 can be implemented in a Head Unit Display (HUD) or a cluster equipped in the vehicle 10, so as to provide visual information about a location where a sound occurs. Further, the notification interface 200 can be implemented in a navigation device coupled with the sound tracking apparatus 100 via a wired communication network such as a Controller Area Network (CAN) bus or the like. Further, the notification interface 200 can be included in in a smart device, such as a smartphone, a tablet, a smartwatch or the like, coupled with the sound tracking apparatus 100 via a short-range wireless technology such as BLUETOOTH, NFC, Wi-Fi or the like.

Figure 3:
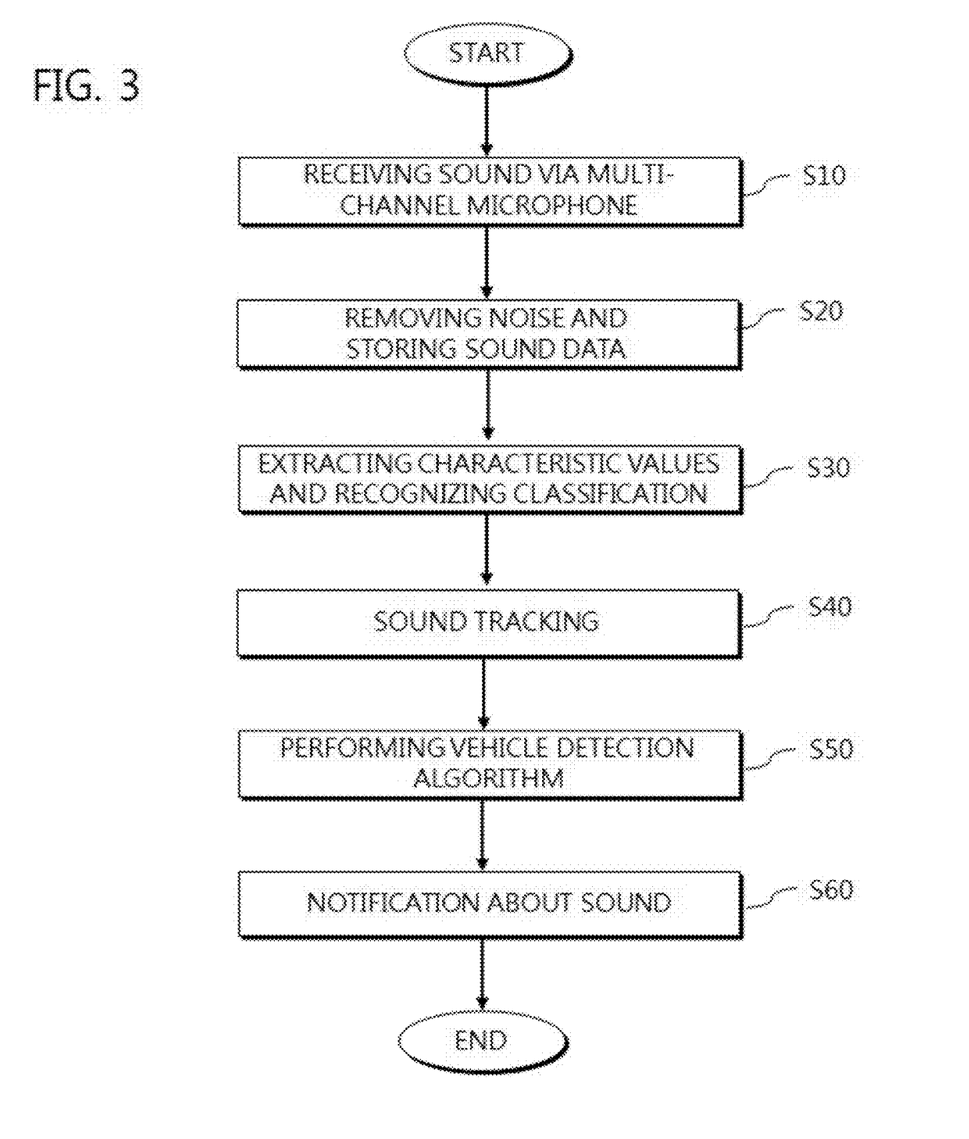
FIG. 3 describes an operation method of the sound tracking apparatus shown in FIG. 2.
Figure 4:
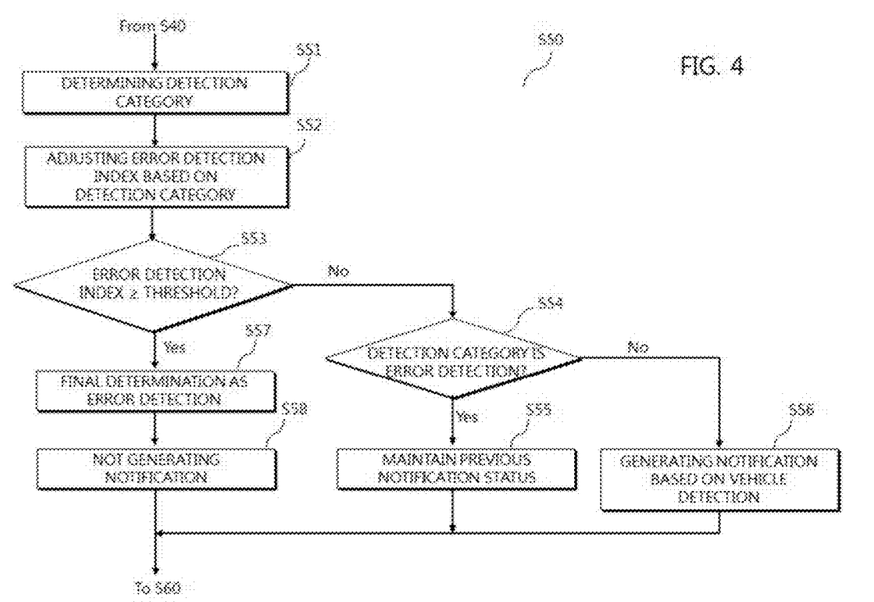
FIG. 4 shows a S50 step shown in FIG. 3.
Figure 5:
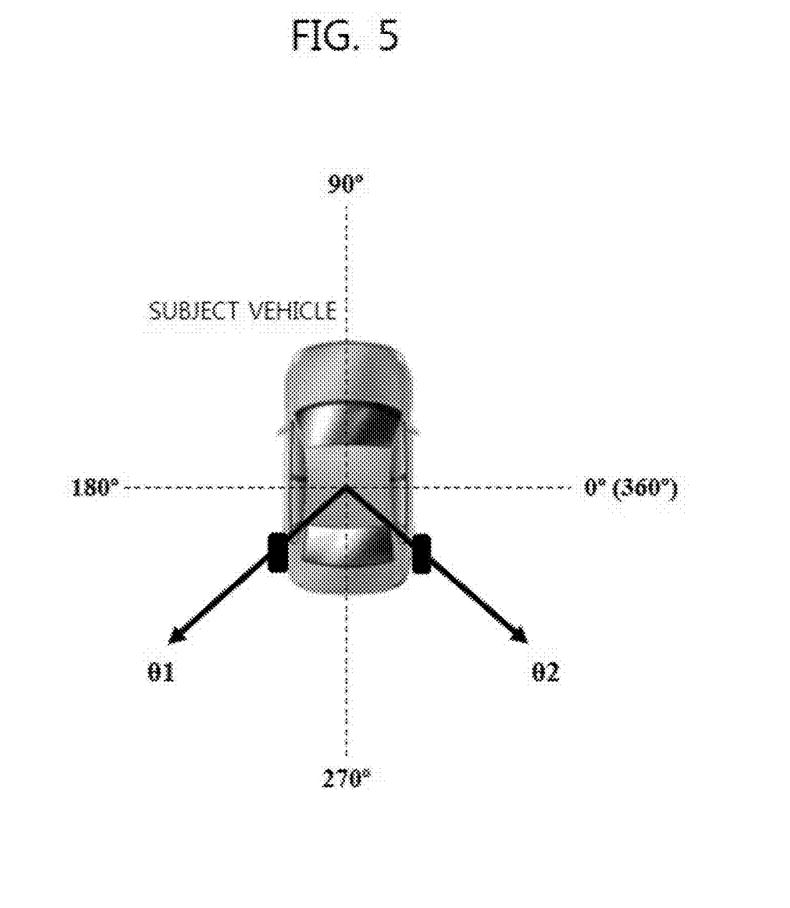
FIGS. 5 and 6 describe an example when a detection category is an error detection.
Figure 6:
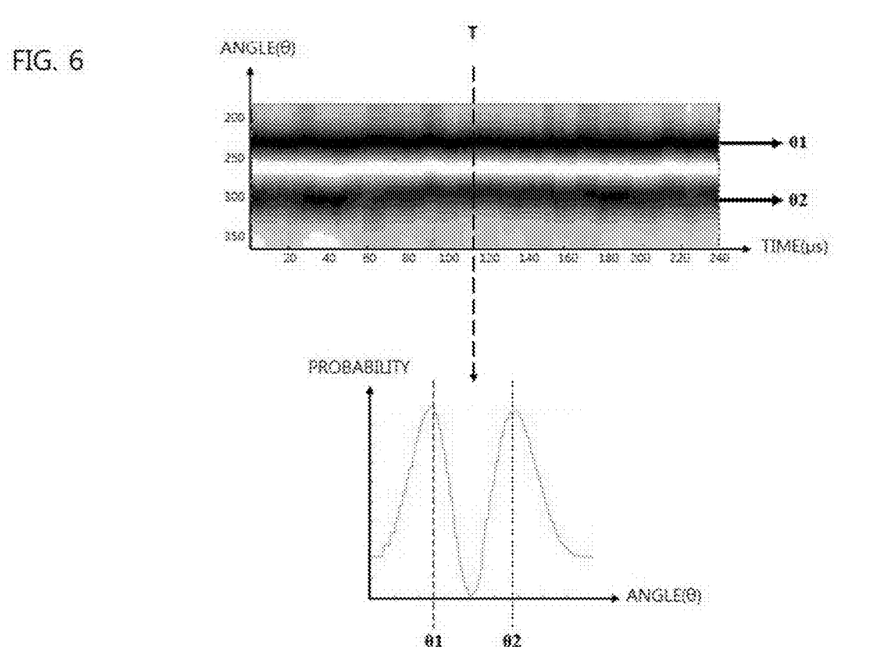
Figure 7:
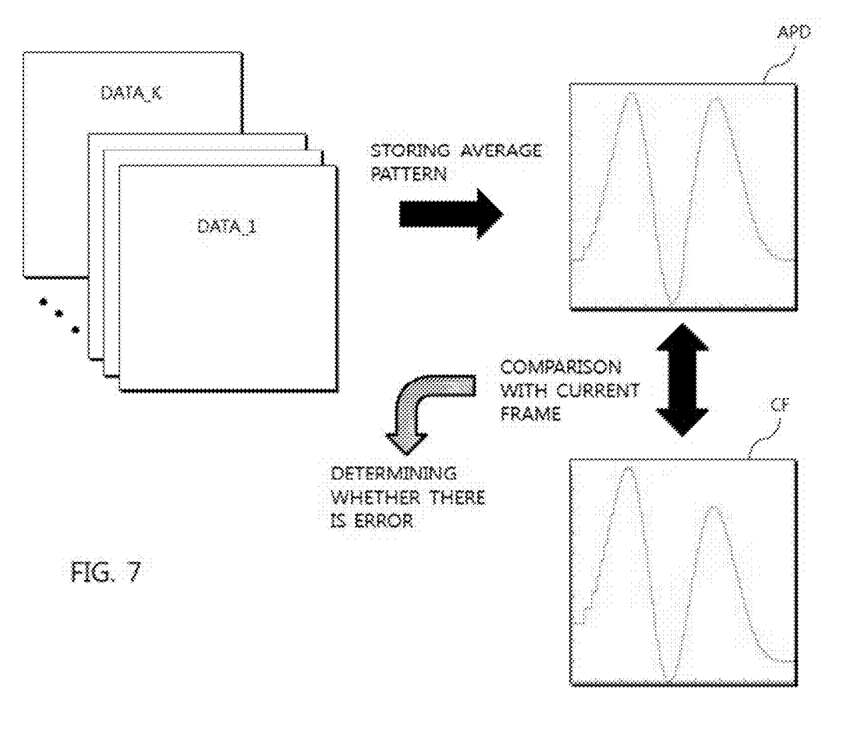
FIGS. 7 and 8 describe how a vehicle detection unit shown in FIG. 2 determines the detection category as the error detection.
Figure 8:
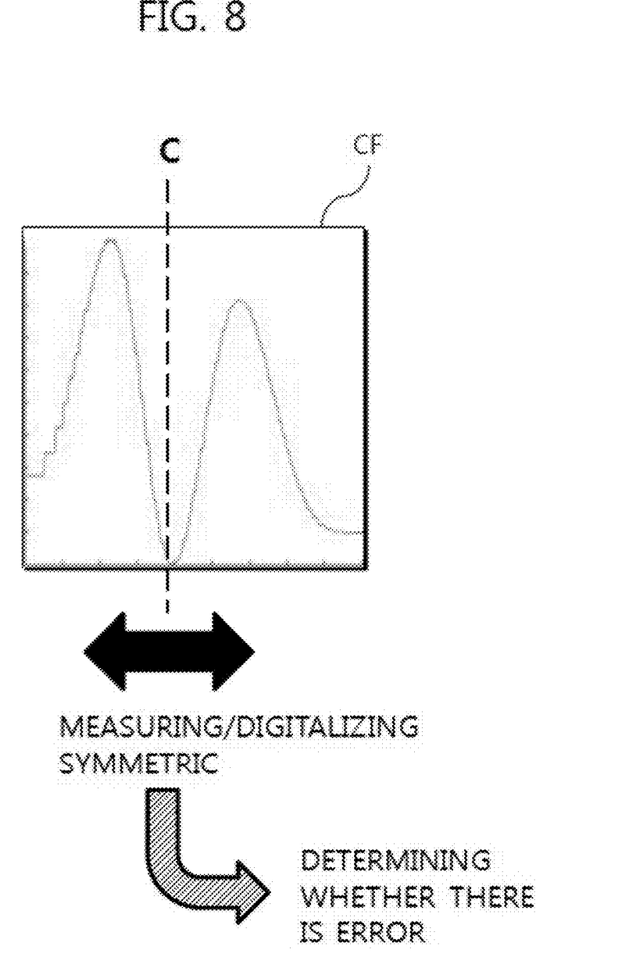
Figure 9:
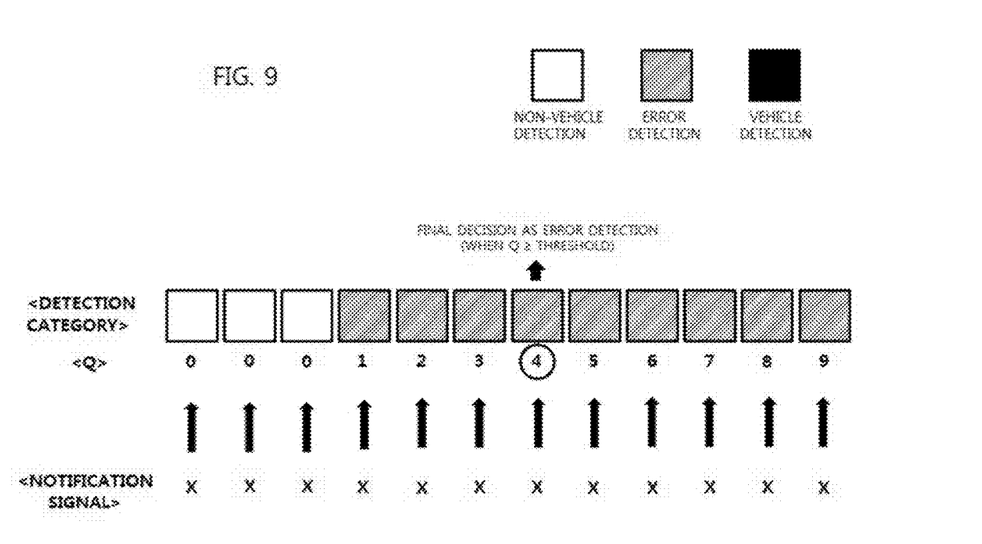
FIGS. 9 and 10 show how an error avoiding unit shown in FIG. 2 controls a notification generation unit.
Figure 10:
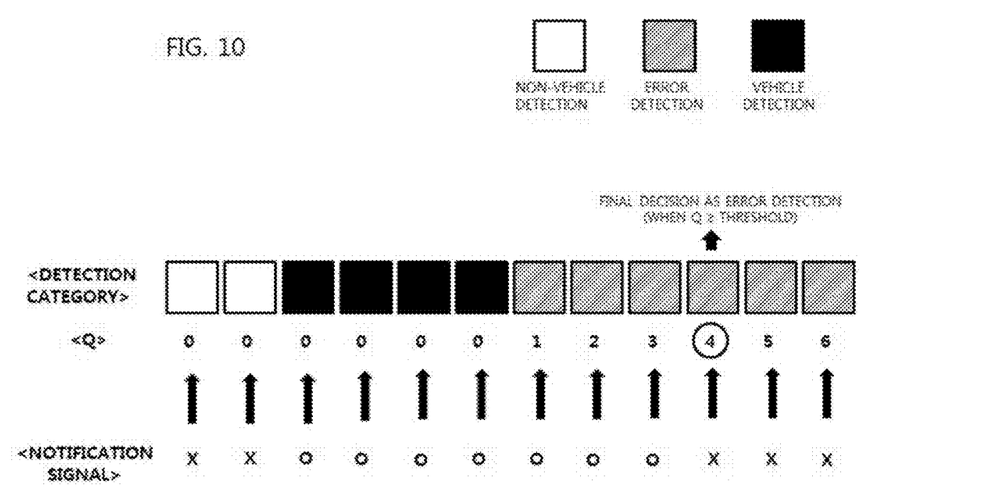

FIG. 3 describes an operation method of thy: sound tracking apparatus shown in FIG. 2. FIG. 4 shows a S50 step shown in FIG. 3. FIGS. 5 and 6 describe an example when a detection category includes, an error (i.e., error detection). FIGS. 7 and 8 describe how a vehicle detection unit shown in FIG. 2 determines the detection category as the error detection. FIGS. 9 and 10 show how an error avoiding unit shown in FIG. 2 controls a notification generation unit.

Referring to FIG. 3, the operation method executed by the sound tracking apparatus 100 shown in FIG. 2, i.e., method for providing sound tracking information, is described.

The signal processing unit 110 can detect sounds occurring adjacent to a subject vehicle 10 and receive sound data generated through an analog-digital conversion of the sounds (S10).

The signal processing unit 110 can perform a noise filtering against the obtained sound data, and the data storage unit 120 can store the sound data of which noise is removed (S20).

The sound recognition 130 can extract or abstract characteristic values a time domain and a frequency domain, from the sound data delivered from the data storage unit 120, use a classifier to classify the characteristic values so as to generate a sound classification result (S30).

Regarding a type or a class of sounds having a higher confidence level than a threshold, based at least on the sound, data, the sound tracking unit 140 can generate information about a probability of whether an object or a target corresponding to the type or the class of sounds exists at each angle in each frame continued according to a time (S40).

The vehicle detection unit 150 and the error avoiding unit 160 executing a vehicle detection algorithm can determine a detection category and remove an error (S50).

FIG. 4 shows the step (S50) shown in FIG. 3.

The vehicle detection unit 150 can determine a detection category based at least on a sound tracking result (S51).

The sound tracking result can include information about a probability of another vehicle corresponding to sibilant voices, which are presumed to conic from tires in each frame continued according to a time. Accordingly, when the probability of whether another vehicle in the sound tracking result is equal to or larger than a threshold (e.g., 90%), the vehicle detection unit 150 determine that there is another vehicle at the corresponding angle.

When even determining that there is another vehicle, the vehicle detection unit 150 can further consider whether its determination includes an error (i.e., error detection).

Referring to FIG. 5, if a right of a subject vehicle is 0 degree on the subject vehicle basis, it can be determined that a forward becomes 90 degrees, a left side does 180 degrees, and a backward does 270 degrees.

Sounds can be coming from another vehicle well as rear tires of the subject vehicle. Herein the sounds coming from the rear tires can be entered via the multi-channel microphone 50 of the subject vehicle.

In FIG. 6, there is a graph showing a sound tracking result generated by the sound tracking unit 140 under a circumstance where there is no another vehicle running close to the subject vehicle. In graph, as darker, there is a higher probability of whether another Vehicle exists at each angle.

That is, in a subject vehicle shown in FIG. 5, there are two rear tires at a first angle θ1 and a second angle θ2. Referring to FIG. 6, sound data at the first angle θ1 and the second angle θ2 are darker than another sound data so that it could be determined that another vehicle exists at the first and second angles θ1, θ2. For example, the first angle is about 235 degrees, while the second angel is about 305 degrees.

FIG. 6 includes another graph showing a relationship between a probability and an angle θ of a single frame matched with a particular time T in the above described graph showing the sound tracking result. Referring to this graph, higher or highest probability can be estimated at the first and second angles θ1, θ2. The graph, shows a symmetric type result on a median value basis between two probabilities at the first and second angles θ1, θ2.

As above described, in a circumstance even when there is no another vehicle running nearby a subject vehicle, it might be determined that there are other vehicles based at least on the sound data including sibilant voices coming from rear tires of the subject vehicle.

For example, when another vehicle runs close to the subject vehicle, the sibilant voices coming from the rear tires of the subject vehicle has lower volumes than another sounds coming from plural tires equipped in the another vehicle. Thus, in this case, there is no misunderstanding that another vehicle would exist based on the sibilant voices coming from the rear tires of the subject vehicle.

As above described, in a case even when it is, determined that another vehicle exists near the subject vehicle, the vehicle detection unit 150 can further determine, whether the result showing the another vehicle running close to the subject vehicle includes an error.

FIGS. 7 and 8 describe two different methods of how the vehicle detection unit 150 can determine that the vehicle detection as the detection category includes an error (e.g., the error detection) caused by frictional sounds coming from the rear tires of the subject vehicle.

Referring to FIG. 7, as a first method, the vehicle detection unit 150 can accumulate plural pattern data DATA_1 to DATA_K (K is an integer equal to or larger than 2) between an angle θ and a probability when there is the error detection caused by the frictional sounds coming from the rear tires of the subject vehicle, and store an average pattern data APD of accumulated plural pattern data. Herein, referring to FIG. 6, the pattern data includes a pattern of graph showing a relationship between an angle θ and a probability of the error detection caused by frictional sounds coming from the rear tires of the subject vehicle.

The plural pattern data DATA_1 to DATA_K can be determined according to a specification of the subject vehicle, and then stored in the sound tracking apparatus 100 by an operator.

By way of example but not limitation, the average pattern data APD can be generated by calculating an average of the plural pattern data DATA_1 to DATA_K at each angle.

The vehicle detection unit 150 can compare a frame CF of a current sound tracking result with the average pattern data APD to obtain a similarity. The similarity can be measured based at least on a percent similarity, Jaccard similarity (index/coefficient), or the like. Hereinafter, it can be assumed that a percent similarity method is used in the disclosure.

When the similarity is higher than a threshold (e.g. 75%), the vehicle detection unit 150 can determine that the vehicle detection in the frame CF of the current sound tracking result includes an error caused by frictional sounds coining from the rear tires of the subject vehicle. Further, when the similarity is lower than or equal to the threshold, the vehicle detection unit 150 can determine that the vehicle detection in the frame CF of the current sound tracking result does not include an error caused by frictional sounds coining from the rear tires of the subject vehicle.

These determinations can be reasonably achieved because distribution about probability values corresponding to the frictional sounds coming from the rear tires of the subject vehicle generally includes a regular pattern.

That is, the vehicle detection unit 150 can compare an average pattern statistically, showing an error (error detection) caused by the frictional sounds coming from the rear tires of the subject vehicle, with a current frame, and determine whether an error is included based at least on the comparison (e.g., similarity between the average pattern and the current frame) so as to recognize the error detection caused by the frictional sounds coming from the rear tires of the subject vehicle more exactly.

Referring to FIG. 8, as a second method the vehicle detection unit 150 can determine a median angle C in a frame CF of the current sound tracking result, and obtain symmetry on a basis of the median angle C.

The median male C can be an angle having the lowest probability in a range of median angle (e.g., 250 to 290 degrees, or a predetermined range from a center of 270 degrees) which can be determined experimentally.

The similarity can be obtained by plural methods. For example, a ratio of a constant value e.g., 1, to a difference between probabilities of a left angle, e.g., (C−10) θ, and a right angle, e.g., (C+10) θ, from the center of a median angle C can be averaged to obtain the similarity.

When the similarity is higher than a threshold (e.g., 75), the vehicle detection unit 150 can determine that the vehicle detection in the frame CF of the current sound tracking result includes an error caused by frictional sounds coming from the rear tires of the subject vehicle. Further, when the similarity is lower than or equal to the threshold, the vehicle detection unit 150 can determine that the vehicle detection in the frame CF of the current sound tracking result does not include an error caused by the frictional sounds coming from the rear tires of the subject vehicle.

These determinations can be reasonably achieved because distribution of probability values estimated based on the frictional sounds coming from the rear tires of the subject vehicle has distinct symmetry.

That is, the vehicle detection unit 150 can measure symmetry of a current frame to determine whether an error is included, in order that the error detection caused by the frictional sounds coming from the rear tires of the subject vehicle can be more exactly recognized.

In a case when there is another vehicle running close to a subject vehicle and it is determined that no error is included, the vehicle detection unit 150 can determine the detection category as the vehicle detection.

In a case when there is another vehicle running close to a subject vehicle and it is determined that any error is included, the vehicle detection unit 150 can determine the detection category as the error detection.

In a case when there is no other vehicle running close to a subject vehicle, the vehicle detection unit 150 can determine the detection category as the non-vehicle detection.

The vehicle detection unit 150 can deliver the detection category and angle information (i.e., an angle on a subject vehicle basis about a location where another vehicle exists) into the error avoiding unit 160.

The error avoiding, unit 160 can change or adjust the error detection index based at least on the detection category (S52). When the detection category is the error detection, the error detection index can be increased by 1.

The error detection index is a kind of reference value used for finally determining whether an error could be included when the detection category is the error detection. For example, the error detection index can be an integer larger than or equal to 0. That is, the minimum of the error detection index can be 0.

The error avoiding unit 160 can increase the error detection index by 1 when the detection category is the error detection, and drop or decrease the error detection index by 5 when the detection category is the non-vehicle detection or the vehicle detection. This is for blocking to generate a notification immediately even if the error detection is temporarily released or ceased by a system error, or the like, while the error decision is continuously stayed. Herein, when the error detection index is in a range of 0 to 4 (less than 5), the error detection index becomes 0 (the minimum value) even if decreased by 5.

The error avoiding unit 160 can determine whether the error detection index is equal to or larger than a threshold (S53). The error detection index can be a valuable used for determining whether a situation when the detection category is the error detection includes an error lastly. For example, the threshold is 4, but it can be a predetermined aloe adjusted based at least on an interval of frames in the sound tracking result (i.e., a period of sound tracking). As the interval is longer, the threshold can be lower.

If the detection category is the error detection (e.g., 'YES' in the step S54) when the error detection index is below the threshold (e.g., 'NO' in the step S53), the error avoiding, unit 160 can make the notification generation unit 170 hold a previous notification status (S55). The previous notification status can include different states of generating, a notification or not generating the notification.

If the detection category is the vehicle detection, not the error detection (e.g., 'NO' in the step S54) when the error detection index is below the threshold (e.g., 'NO' in the step S53), the error avoiding unit 160 can make the notification generation unit 170 generate a notification signal (S56). If the notification signal has been previously generated, the error avoiding unit 160 could control the notification generation unit 170 so as to keep the previous notification signal.

Further, the error avoiding unit 160 can block the notification generation unit 170 to generate a notification signal if the detection category is the non-vehicle detection, not the error detection (e.g., 'NO' in the step S54).

When the error detection index is equal to or larger than the threshold (e.g., 'YES' in the step S53), the error avoiding unit 160 can finally determine that the detection category based on a current sound tracking result is the error detection (S57).

Accordingly, the error avoiding unit 160 can handle that the notification generation unit 170 does not generate a notification signal (S58).

FIGS. 9 and 10 show how the error avoiding unit 160 controls the notification generation unit 170 based at least on the detection category. Hereinafter, it is assumed that an error detection index Q is 4.

Referring to FIG. 9, for example, the error avoiding unit 160 can sequentially receive three non-vehicle detections and nine error detections as the detection category.

When the three non-vehicle detections are delivered, the error avoiding unit 160 keeps the error detection index Q as it is, and determines that the notification generation unit 170 does not generate a notification signal.

However, as the error detection is delivered, the error avoiding unit 160 increases the error detection index Q by 1, Before the fourth error detection is delivered, the error detection index is below 4 so that the error avoiding unit 160 controls the notification generation unit 170 to hold a previous notification status (i.e., a previous state without the notification signal).

When the fourth error detection is delivered, the error detection index Q becomes 4. Then, the error avoiding unit 160 can finally determine that the detection category is the error detection, so that the notification generation unit 170 does not generate a notification signal.

Thereafter, when another error detection is entered subsequently, the error avoiding unit 160 operates repeatedly similar to the previous situation (i.e., when the fourth error detection is delivered).

Assuming that the vehicle detection unit 150 does not find an error caused by rear tires of a subject vehicle, the notification generation unit 170 can continuously generate a notification signal to inform a driver of unnecessary information after the first error detection is inputted as the detection category.

However, the sound tracking apparatus 100 as above described can detect an error caused by rear tires of the subject vehicle so as to avoid providing unnecessary alert or notification to a driver, and thus assist a driving safety.

Referring to FIG. 10, for another example, the error avoiding unit 160 can sequentially receive two non-vehicle detections, four vehicle detections and six error detections as the detection category.

When the two non-vehicle detections are delivered, the error avoiding unit 160 keeps the error detection index Q as it is, and determines that the notification generation unit 170 does not generate a notification signal.

When receiving the vehicle detection after the two non-vehicle detections, the error avoiding unit 160 keeps the error detection index Q, but, makes the notification generation unit 170 generate a notification signal because the vehicle detection is entered as the detection category.

That operation of the error avoiding unit 150 can be repeatedly performed until the fourth vehicle detection is delivered as the detection category.

Then, as the error detection is inputted, the error avoiding unit 160 increases the error detection index Q by 1. Before the fourth error detection is delivered, the error detection index is below 4 so that the error avoiding unit 160 controls the notification generation unit 170 to hold a previous notification status (i.e., a previous state with the notification signal).

When the fourth error detection is delivered, the error detection index Q becomes 4. Then, the error avoiding unit 160 can finally determine that the detection category is the error detection, so that the notification generation unit 170 does not generate a notification signal.

Thereafter, when another error detection is entered subsequently, the error avoiding unit 160 operates repeatedly similar to the previous situation (i.e., when the fourth error detection is delivered).

Referring to FIGS. 9 and 10, the notification signal is not generated immediately when the first error detection is entered as the detection category, and determination of whether the notification signal is generated can be reserved by a threshold of the error detection index Q. These processes can be effective to avoid that a situation having no error (e.g., when two other vehicles run on a location having the same angle with two rear tires of a subject vehicle) can be temporarily misunderstood as the error detection.

Accordingly, the sound tracking apparatus 100 described above can reserve whether generating a notification signal based at least on a threshold of the error detection index Q so that releasing a previous notification status can be avoided by temporary misunderstanding or misleading about non-error detection or error detection.

Referring to FIG. 3, the notification generation unit 170 controlled by the error avoiding unit 160 can generate a notification signal including information about another vehicle operating close to the subject vehicle. Receiving the information, the notification interface 200 can provide information regarding an area where sounds occur to a driver (S60).

As described above, since recognizing an error caused by sounds from rear tires of a vehicle, the vehicle does not provide an unnecessary notification to a driver so that a driving safety could be secured.

Further, because applying a threshold regarding an error detection index to reserve a status, e.g., not generating a notification, when finding a sound pattern similar to an error, an apparatus can avoid releasing a previous notification status, is caused by a temporarily mistaken or miscalculated decision.

The aforementioned forms are achieved by combination of structural elements and features of the invention in a predetermined manner. Each of the structural elements or features should be considered selectively unless specified separately. Each of the structural elements or features may be carried out without being combined with other structural elements or features. Also, some structural elements and/or features may be combined with one another to constitute the forms of the disclosure. The order of operations described in the forms of the disclosure may be changed. Some structural elements or features of one form may be included in another form, or may be replaced with corresponding structural elements or features of another form. Moreover, it will be apparent that some claims referring to specific claims may be combined with another claims referring to the other claims other than the specific claims to constitute the form or add new claims by means of amendment after the application is filed.

The method in accordance with the above-described form may be implemented as a computer executable program and stored in a computer readable recording medium. The computer readable recording medium may be one of a ROM, a RAM, a CD-ROM, a magnetic tape, a floppy disk, an optical data storage device, etc. Further, the computer readable recording medium may be realized in the form of a carder wave (for example, transmission over the Internet).

The computer readable recording medium may be distributed to computer systems connected by a network and be stored and executed as code which is readable by computers in a distributed manner. Further, functional programs, code and code segments to implement the above-described method may be easily deduced by programmers art to which the embodiment pertains.

It will be apparent to those skilled in the art that various modifications and variations can be made in the invention without departing from the spirit or scope of the inventions. Thus, it is intended that the disclosure covers the modifications and variations of this disclosure provided they come within the scope of the appended claims and their equivalents.

What is claimed is:

1. A method for providing sound tracking information, the method comprising:
    detecting whether a sound occurred adjacent to a subject vehicle and generating a sound tracking result based at least on sound data corresponding to a detected sound;
    determining a detection category as one of a non-vehicle detection, an error detection or a vehicle detection, based at least on the sound tracking result; and
    determining an error detection index adjustment based at least on the detection category as well as whether a notification based at least on the detection category is generated, the adjustment including:
        increasing the error detection index when the detection category is determined to be the error detection; and
        lowering the error detection index when the detection category is determined to be one of the non-vehicle detection or the vehicle detection; and
    wherein the sound tracking result includes a probability of whether there is at least one other vehicle at each of a plurality of angles in each of a plurality of frames continued according to time.

2. The method according to claim 1, wherein the determining a detection category comprises:
    determining whether there is at least one angle where the probability is higher than a predetermined threshold in the sound tracking result to detect the at least one other vehicle; and
    determining whether there is the error detection when the at least one other vehicle is detected.

3. The method according to claim 2, wherein the determining whether there is the error detection comprises determining whether the error detection exists based at least on a similarity between a current frame and an average pattern data about patterns existing when an error based on sibilant noises from rear tires of the subject vehicle are detected.

4. The method according to claim 2, wherein the determining whether there is the error detection comprises determining whether the error detection exists based at least on symmetry of a current frame in the sound tracking result.

5. The method according to claim 1, wherein the error detection index is increased by 1 when the detection category is the error detection, and dropped by 5 when the detection category is one of the non-vehicle detection or the vehicle detection.

6. The method according to claim 1, wherein the determining an error detection index comprises maintaining a previous notice status when the error detection index is below a predetermined threshold and the detection category is the error detection.

7. The method according to claim 1, wherein the determining an error detection index comprises generating a notification signal when the error detection index is below a predetermined threshold and the detection category is the vehicle detection.

8. The method according to claim 1, wherein the determining an error detection index comprises avoiding generating a notification signal when the error detection index is over a predetermined threshold.

9. An apparatus for providing sound tracking information, the apparatus comprising:
    a sound tracking unit configured to detect whether a sound occurred adjacent to a subject vehicle and to generate a sound tracking result based at least on sound data corresponding to a detected sound;
    a vehicle detection unit configured to determine a detection category as one of a non-vehicle detection, an error detection, or a vehicle detection, based at least on the sound tracking result; and
    an error avoiding unit configured to determine an error detection index adjustment based at least on the detection category as well as whether a notification based at least on the detection category is generated, the adjustment including:
        increase the error detection index when the detection category is determined to be the error detection; and
        lower the error detection index when the detection category is determined to be one of the non-vehicle detection or the vehicle detection; and
    wherein the sound tracking result includes a probability of whether there is at least one other vehicle at each of a plurality of angles in each of a plurality of frames continued according to time.

10. The apparatus according to claim 9, wherein the vehicle detection unit is configured to determine whether there is at least one angle where the probability is higher than a predetermined threshold in the sound tracking result to detect the at least one other vehicle, and to determine whether there is the error detection when the at least one another vehicle is detected.

11. The apparatus according to claim 10, wherein the vehicle detection unit is configured to determine whether the error detection exists based at least on a similarity between a current frame and an average pattern data about patterns existing when an error based on sibilant noises from rear tires of the subject vehicle are detected.

12. The apparatus according to claim 10, wherein the vehicle detection unit is configured to determine whether the error detection exists based at least on symmetry of a current frame in the sound tracking result.

13. The apparatus according to claim 9, wherein the error detection index is increased by 1 when the detection category is the error detection, and dropped by 5 when the detection category is one of the non-vehicle detection or the vehicle detection.

14. The apparatus according to claim 9, wherein the error avoiding unit is configured to maintain a previous notice status when the error detection index is below a predetermined threshold and the detection category is the error detection.

15. The apparatus according to claim 9, wherein the error avoiding unit is configured to generate a notification signal when the error detection index is below a predetermined threshold and the detection category is the vehicle detection.

16. The apparatus according to claim 9, wherein the error avoiding unit is configured to avoid generating a notification signal when the error detection index is over a predetermined threshold.

17. A vehicle, comprising:
a multi-channel microphone configured to detect whether a sound occurred adjacent to a subject vehicle and to generate sound data corresponding to a detected sound;
a sound tracking device configured to determine a detection category as one of a non-vehicle detection, an error detection, or a vehicle detection, based at least on a sound tracking result based at least on the sound data, and to determine an error detection index adjustment based at least on the detection category as well as whether a notification based at least on the detection category is generated, the adjustment including:
increase the error detection index when the detection category is determined to be the error detection; and
lower the error detection index when the detection category is determined to be one of the non-vehicle detection or the vehicle detection; and
a notification interface configured to acoustically or visually inform a driver of information about at least one vehicle adjacent to the subject vehicle when the notification is generated.

* * * * *